United States Patent
Cerny et al.

(10) Patent No.: US 6,649,050 B1
(45) Date of Patent: Nov. 18, 2003

(54) WATER PURIFICATION SYSTEM

(75) Inventors: Dennis Cerny, Carol Stream, IL (US); Garrett Garcia, Wheaton, IL (US)

(73) Assignee: 21st Century Innovations, Downers Grove, IL (US)

( * ) Notice: Subject to any disclaimer, the term of this patent is extended or adjusted under 35 U.S.C. 154(b) by 20 days.

(21) Appl. No.: 10/119,806

(22) Filed: Apr. 11, 2002

(51) Int. Cl.[7] ............................... C02F 1/50; C02F 5/08
(52) U.S. Cl. ................. 210/198.1; 422/266; 422/274; 422/278; 137/268
(58) Field of Search ............... 210/198.1; 137/268; 422/266, 274, 278

(56) References Cited

U.S. PATENT DOCUMENTS

| | | | |
|---|---|---|---|
| 3,423,182 A | * | 1/1969 | Klasky |
| 3,943,582 A | * | 3/1976 | Daeninckx et al. |
| 3,952,339 A | * | 4/1976 | Baur et al. |
| 4,244,062 A | * | 1/1981 | Corsette |
| 4,455,692 A | * | 6/1984 | Hegge et al. |
| 5,074,328 A | * | 12/1991 | Reinders |
| 6,101,639 A | * | 8/2000 | Hsu |
| 6,221,244 B1 | * | 4/2001 | Yassin |

* cited by examiner

Primary Examiner—Thomas M. Lithgow
(74) Attorney, Agent, or Firm—Basil E. Demeur; Alan Samlan; David Hurley

(57) ABSTRACT

A water purification system for fluid recirculating systems formed by a container having side walls, a top and bottom wall, and a front wall fixedly secured to the side walls, top wall and bottom wall. The front wall is provided with a plurality of apertures for allowing fluid to seep therein. A container is provided with a solid mass of dissolvable material intended for purification of the fluid which flows through the container.

9 Claims, 1 Drawing Sheet

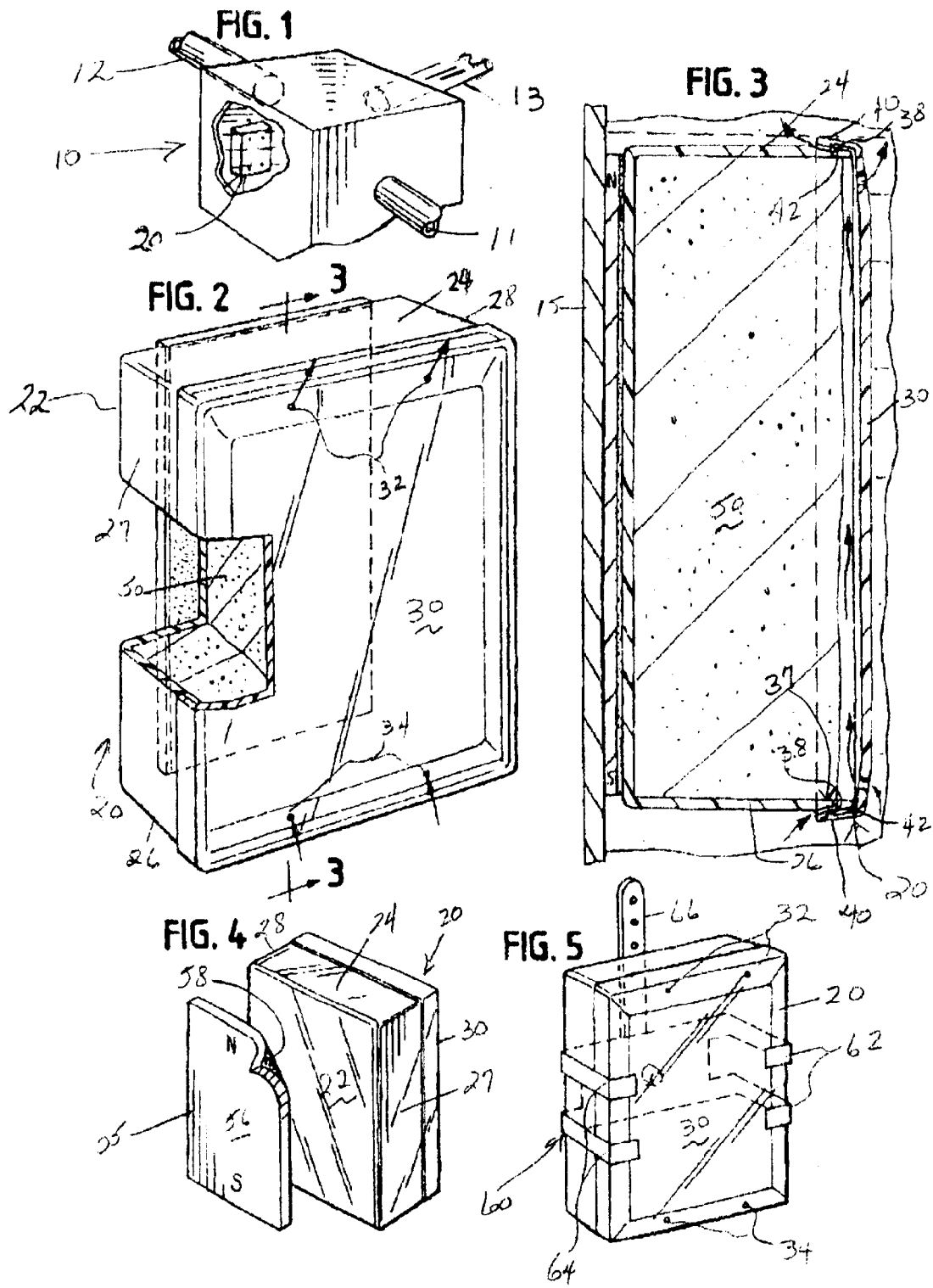

WATER PURIFICATION SYSTEM

BACKGROUND OF THE INVENTION

This invention relates to a system for cleaning and purifying water systems, primarily those types of water systems which are utilized in structures having air conditioning systems. It is well-known that in these types of systems, cooling towers are employed, usually positioned on the rooftops of the buildings, among other locations through which the circulating water passes, in order to accomplish the cooling effect for the structures air conditioning system. The cooling towers are used in the interest of saving water in order to recirculate the same. The cooling towers are employed for the purpose of cooling the water, and then sending it back through the system in order to effect the air conditioning/cooling effect for the building, with the warmed water then being returned to the cooling towers for cooling again and recirculation.

One of the traditional problems with such types of cooling systems is that the water absorbs any number of particulate contaminates, including scaling ions from the make-up water itself and/or from the pipe system, corrosion, algae, microbes of various types, and other organisms. In many cases, the microbial organisms will begin a growth pattern in the cooling tower reservoir, and hence, water that is recirculated will absorb such types of microbial particles, and put them into the system. In addition, the reservoirs on the cooling towers are generally open to the atmosphere, and hence, any dust, dirt, or other particulate matter which happens to be in the environment, will end up becoming trapped in the reservoir, and such particulate matter then gets into the water which is also then recirculated through the system.

Heretofore, a variety of chemicals are put into the reservoir in order to attempt to eliminate some if not most of the foreign particulate matter or contaminates. Usually, the chemicals are put into the system by pumps, which take the chemicals from containers or drums, and pump it directly into the reservoir. Hence, for each different type of chemical that the user intends to employ to remove a certain type of contaminate, a container of that particular chemical must be ordered, positioned on the rooftop, or other segregated space and then a pump hose is positioned within the container, and the pump actuated in order to pump such chemicals into the water. In many instances, such containers are 55 gallon drums which are both heavy and cumbersome. This of course requires a fair amount of physical labor, and requires constant overseeing to insure that pumps are functional and equipment is maintained. It will be apparent that many of these contaminants are dissolved in the water, and therefore cannot be readily observable, and hence, the operator simply guesses as to when a certain chemical may be needed. For example, a microbial contaminate will not be obvious in the water. If it does exist, one should be employing a chemical purifying agent which will eliminate the microbial contaminate. However, the operator may well put a chemical into the system in order to cleanse the system of such microbial contaminates when none are present. This is wasteful, and potentially harmful to the occupants of the building.

The present invention is intended to provide a safer and labor free system for removing and purifying water employed in such cooling systems. The present invention eliminates the need for purchasing large containers and employing the labor, space and associated equipment required in order to dispense such chemicals into the water system.

Hence, the present invention takes advantage of the fact that most purification chemicals can be obtained in a solid mass format, as opposed to a liquid format. In addition, the present invention takes advantage of the fact that it is well known in such cooling towers and other types of water systems, there is a constant flow of water through the system as water is recirculated. This is the essence of an air conditioning system employing a cooling tower as part of the re-circulating system. Hence, the present invention provides a container into which a solid mass of contaminate purifying chemicals are positioned, the container being provided with inlet and outlet ports and means provided for positioning and maintaining the container within the fluid reservoir, below the water line to take advantage of the constant flow of water through the system. The solid mass of purifying chemicals will then become dissolved into the water as the same flows through the container, dissolving the solid mass of chemicals on a time basis. When the solid mass of purifying chemicals is totally dissolved, the container may be easily removed, and replaced with another similar container fully loaded with purifying chemicals eliminating the need for the operator to handle any chemicals.

Hence, the present invention relates primarily to the construction of the container in order to accommodate the flow of water into and through the container for the purpose of dissolving the purifying chemicals.

It will be apparent from the following description, that the present invention eliminates the need for purchasing chemicals in large containers in the liquid form, and permits the operators to install the purifying chemicals of whatever nature desired, in the system without the need of handling the chemicals or otherwise becoming exposed to any potential dangerous chemicals.

DESCRIPTION OF PRIOR ART

The prior art with respect to methods for purifying water or other fluids in a closed or open system, especially those used in air conditioning systems where water flows through a cooling tower, is presently quite cumbersome. Such systems generally require that bulk quantities of any desired purification chemical be purchased, hauled to the location where the cooling tower is located and then pumps utilized in order to remove the purification chemicals from the bulk containers and pump the same into the fluid flow of the fluid to be purified. Alternatively, air conditioning systems will have an inlet pipe located elsewhere in the building. When purification chemicals are desired in the system, one would insert a necessary piping into the in-flow pipe, in order to pump or otherwise force the purification chemicals through the inlet pipe. However, the present systems generally do require that chemicals be purchased in bulk quantities, usually in large containers such as 55 gallon drums and then hauled to the point at which the equipment exists for the interposition of the chemicals into the system.

The prior art generally requires the operators to handle or be exposed to purifying chemicals in some manner. Devices however, exist with respect to holders or containers for toilet bowls or other water closets in order to dispense cleaning solutions, for example bleach into the flush water of a toilet tank. For example, U.S. Pat. No. 4,709,424 illustrates a toilet bowl cleaner which contains a bleach in a chamber for holding a cake of cleaning material. A siphoning effect is provided at the top of the container, the siphon comprising overlapping open-ended conduits. In order to operate, however, there must be an intake of flush water in order to remove the cleaning solution from the device. Indeed, the device requires that the flush water drop below the bottom of the container so that the device can operate. Hence, the device requires that water constantly drop below the container, and then rise above the container as the toilet bowl refills with water.

U.S. Pat. No. 3,943,582 is directed to a holding device for holding a cleaning product in a toilet tank bowl. The obvious similarity between the device shown in the U.S. Pat. No. 3,943,582 patent in applicant's device is merely in showing a holder which is intended to hold a device based upon hooking the same to the water reservoir.

Design Pat. No. 361,109 is directed to a toilet bowl dispenser wherein there is provided a fully formed box which is apertured and held in position between a pair of opposed jaws forming a holding bar for the device. It will be appreciated from the following description that while applicant employs pairs of apertures in the front wall of his purification container, nevertheless, the entire construction of applicant's container differs from what is shown in design Pat. No. 361,109, and submits that the subject device would be inapplicable to the invention herein.

The present invention provides a purification container which is designed and constructed in a manner to permit the water to seep into the container on a controlled basis in order to cause a timed dispersement and dissolution of the purification chemicals into the flow stream of the fluid. Particular details of the construction of applicant's invention are set forth more fully hereinafter.

BRIEF SUMMARY OF THE INVENTION

In summary, the present invention provides a container which is particularly designed to accommodate a mass of solid dissolvable chemicals, which has the specific purpose of removing certain contaminates from a stream of fluid which is contaminated with many types of particulate contaminates. The container is designed to contain a solid mass of chemical, having appropriate apertures strategically positioned in order to allow water to flow through the container for the purpose of dissolving the contaminates in the fluid or water on a constant basis, thereby purifying the fluid removing the particular contaminates for which the solid mass of purifying chemical is intended to counteract.

The container is provided with apertures appropriately located, and is designed with a front wall which is lockingly engaged to the container, but locked into position in such a manner as to permit seepage of fluid therethrough in order to insure that the interior confines of the container accommodate the flow of water therethrough.

Just as importantly, the present invention affords the operator the ability to handle potentially dangerous chemicals which are required in order to purify a recirulating water system, primarily handling the container of the present invention and installing the same in the system. The present invention eliminates the need for the operator to handle the chemicals, or otherwise become exposed to the same as is presently generally required with the methods and systems utilized for introducing such chemicals into a recirculating water system.

OBJECTS AND ADVANTAGES

It is therefore the principal object of the present invention to provide an improved system for removing contaminates from a flow of water or other fluid in a closed re-circulating system by utilizing the purification chemicals in a solid mass format, causing such chemicals to be dissolved into the flow of fluid as the same recirculates through a reservoir generally associated with such closed or open systems. In particular, the present system employs an enclosed container which incorporates the solid mass of purification chemicals therein, the container provided with appropriate apertures and a seeping front wall in order to insure that the fluid will flow through the container thereby dissolving the purification chemicals into the fluid for the purpose of cleansing the same.

In conjunction with the foregoing object, it is a further object of the present invention to provide a container of the type described wherein the container is enclosed on all sides, and includes a front wall which is lockingly engageable to the container, in a non-fluid tight sealing arrangement, thereby providing further means for fluid to seep into and through the container for the purpose of dissolving the solid mass of purification chemicals contained therein.

In furtherance of the above objects, a further object of the present invention is to provide a container of the type described, into which a solid mass of purification chemicals may be positioned, the container having a front wall which is lockingly engageable to the container in a non-fluid tight sealing arrangement, the front wall containing at least a pair of apertures at the top end, and opposed apertures at the bottom end, thereby to accommodate fluid flow through said apertures, and through the closed peripheral edges of the front wall relative to the container in order to accommodate a constant flow of fluid therethrough.

A further object of the present invention is to provide a convenient means for hanging the container within a reservoir, and below the water line, which, in the most preferred embodiment of the invention, consists of a magnetic pad secured to the back wall of the container, and allowing the container to be magnetically adhered to the wall of a metallic reservoir, which will accept a magnetic field.

As an alternate embodiment of the present invention, the container is also designed to be provided with a holder, having an arresting cage at one end, for holding and arresting the container therein, and having an elongated arm extending upwardly therefrom, with a holding clamp designed and adapted to clamp onto the edge of a reservoir, thereby to hold and maintain the container at a point below the usual fluid level within the reservoir, thereby permitting fluid flow to pass through the container for the purpose of dissolving the solid mass of chemicals contained therein. Such types of holders may be employed where the reservoir is either made of a plastic material, or a non-magnetic metal such as stainless steel.

A further feature of the present invention is to provide a container of the type described, the container containing a sold mass of purification chemicals therein, whereby upon the exhaustion of the chemicals within the container, the container may simply be removed from the wall of the reservoir, and replaced with a fresh container, thereby eliminating the need for the operator to handle any chemicals of whatsoever nature. Hence, the ease of replacement of the container containing the chemicals within the system is greatly simplified.

Further features of the invention pertain the particular arrangement of the parts and elements whereby the above outlined objects and advantages may be achieved. These objects, as well as other objects, may be achieved as is more fully described hereinafter in the following specification taken in conjunction with the accompanying drawings.

BRIEF DESCRIPTION OF DRAWINGS

FIG. 1 is a schematic view, partly in phantom, illustrating a typical reservoir in a water cooling system and showing a purification container mounted therein;

FIG. 2 is a front elevational view, partly in cross section, showing the container of the present invention containing the solid mass of purification chemicals, and showing the front wall having opposed apertures at the top and bottom thereof for allowing fluid flow through the container for the purpose of dissolving the contained solid mass of purification chemicals.

FIG. 3 is a side cross sectional view of the container of the present invention taken along the line 3—3 of FIG. 2, showing the container, the magnetic holding pad affixed thereto, and having the front wall lockingly engaged thereon, showing the non-fluid tight sealing arrangement of the front wall relative to the container side walls.

FIG. 4 is a rear elevational view of the subject container showing the manner in which the magnetic pad is secured to the back wall of the container;

FIG. 5 shows the container of the present invention as positioned within a holder assembly, including an arresting holder clamp, and having an elongated arm extending upwardly therefrom which is adapted to secure the holder to the upper lip of a reservoir in a manner commonly known in the art.

DETAILED DESCRIPTION OF DRAWINGS

FIG. 1 is intended to show a typical-reservoir 10 which is interposed in a closed water return system, the reservoir 10 having an in-flow pipe 11 and out-flow pipe 12, and a make-up water pipe 13. In a typical cooling tower, the reservoir 10 contains fluid such as water, which is brought into the system by the make-up pipe 13, and dwells in the reservoir until it reaches a sufficient water height. The demands of the air conditioning system will cause a constant flow of water through the in-flow pipe 11, and out-flow pipe 12.

The reservoir 10 is shown to have a wall 15 (FIG. 3), which the purification container 20 is attached as is schematically shown in FIG. 1. The purification container 20 is affixed to the wall 15 on the inside of the reservoir 10 and positioned below the constant fluid level of the reservoir 10.

With reference to FIGS. 2 and 3 of the drawings, the detailed construction of the container is illustrated. The purification container 20 is shown to have a back wall 22, a top wall 24, a bottom wall 26, and opposed side walls 27 and 28 respectively. The purification container 20 is enclosed by means of a front wall 30 which is lockingly engaged onto the top wall 24, bottom wall 26, and side walls 27 and 28 respectively. During construction, the purification container is formed, leaving the front portion open. A solid mass of purification chemicals 50 is positioned within the container 20, afterwhich the front wall 30 is lockingly engaged into position.

The front wall 30 includes a pair of top apertures 32 and a pair of opposed bottom apertures 34. The respective apertures 32 and 34 permit fluid flow into the container once the front wall 30 is lockingly engaged onto the container 20.

FIG. 3 illustrates the manner in which the front wall 30 is lockingly engaged onto the container 20. It will be seen that the top wall 24, bottom wall 26, and side walls 27 and 28 each have a periphery 37 which include a reverse slot 38 formed therein. The front wall 30 is provided with a peripheral lip 40 which is formed with a matingly engaging reverse flange 42 which will mate with the reverse slot 38 in order to lockingly engage the front wall 30 onto the container 20. It will also be appreciated that the engagement as between the reverse slot 38 and reverse flange 42 is such that a non-fluid tight engagement is achieved thereby to permit water to seep in between the front wall and the corresponding side walls 27 and 28, top wall 24 and bottom wall 26. In this manner, fluid will seep into the container between the point of attachment of the front wall 30 to the container 20, as well as through the corresponding apertures 32 and 34.

The object is to achieve a filling of the interior portion of the container 20 so that the solid mass of purification chemicals 50 contained therein is fully encased by the fluid. It will be appreciated that as water constantly flows through the reservoir 10 via the in-flow pipe 11 and passes out the via out-flow pipe 12, the fluid is in constant motion, creating a pressure fluid velocity. The pressure of fluid velocity forces water into the container 20, and causes the solid mass of purification chemicals 50 to ultimately disintegrate and dissolve in the fluid. The purification chemicals once dissolved in the water, will then accomplish the task desired by such chemicals.

It is contemplated that the solid mass of purification chemicals 50 may be selected from a number of such chemicals available, depending upon the contaminates desired to be removed from the fluid. Such types of chemicals include scale inhibitors, corrosion inhibitors, biodispersements, biopenetrants, microbiocides, biocides, algaecides, or any other types of chemicals generally used in the treatment of and purification of fluid such as water. The essence of the invention is to provide such chemicals in a solid format, as opposed to a liquid format which is currently in use, such that the solid mass may be positioned within the purification container 20, which once installed in the reservoir, will function to cause a gradual dispersion of such chemicals in the fluid and purify the fluid in the manner intended.

It will further be appreciated that the positioning of apertures within the front wall 30 will be dictated by the type of chemical encased within the container 20, as well as the dissolution rate desired. In some applications, it may be desirable to cause a rapid dissolution of the chemicals into the flowing fluid, and in such instances, one may increase the number of apertures, or increase the size thereof. Hence, it is contemplated that the front wall 30 of the container 20 may be adapted accordingly as the application dictates.

FIGS. 4 and 5 illustrate the manner in which the purification container 20 may be mounted to the reservoir 10. With specific reference to FIG. 4, it will be observed that the container includes a back wall 22, for which a magnetic pad 55 may be securely affixed. The magnetic pad 55 includes a magnetic surface 56 which forms the back wall of the pad, and an adhesive surface 58 which will accommodate the securement of the magnetic pad 55 to the back wall 22 of the container 20. If the reservoir is formed of a typical metallic material, the container 20 may then be positioned within the reservoir 10 as illustrated in FIG. 1, by magnetically applying the same to an interior wall of the reservoir 10 and below the fluid level therein. It will also be appreciated that in such applications, the replacement of the purification container 20 may be easily accomplished by simply pulling the purification container 20 off the wall, and substituting a fresh container having a fresh supply of purification chemicals. Alternatively, the magnetic pad may be fixedly secured in any other known manner, such as molding the pad directly to the wall surface.

In FIG. 5, a holder is illustrated which accomplishes the securement of the purification container 20 within a reservoir which may be formed of either stainless steel, or a plastic material and hence, are non-magnetic.

The holder is formed by a pair of opposed grip claws 62 and 64 respectively, which are sized and positioned in spaced apart relation in a manner in order to securely grip and hold the purification container 20 in position therebetween. The holder is completed by an elongated holding bar 66 which extends upwardly therefrom, and would include a hook (not shown) in a manner which would permit it to hook on to the side of the reservoir wall in a manner commonly known in the art. The holding bar 66 would require a length sufficient to hold and maintain the purification container 20 below the fluid level in the reservoir 10 in order to insure that fluid totally encompasses the internal confines of the purification container 20 in order to accomplish the dissolution of the purification chemicals 50 in the fluid. Hence, to that extent, one would, by measuring, determine the necessary length of the holding bar 66. in order that the purification container 20 would be maintained below the fluid level in the reservoir 10. Ideally, the holding bar may be made of a telescopic construction so that the height of the holding bar 66 may be adjusted depending upon the particular holding tank or reservoir involved.

The purification container 20 may be made of any suitable material, such as preferably plastic. A polypropylene plastic appears to be desirable since it is generally non-reactive with most of the purification chemicals employed in the art. In this manner, the container may be a molded item, and the lid may be similarly molded in order to achieve an economic efficiencies in the manufacturing process.

It is further contemplated that more than one purification container 20 may be employed at any given reservoir 10. Hence, where it is determined that contaminants include a variety of contaminates such as algaecides as well as corrosion in the fluid, one could obtain the necessary solid mass of purification chemicals specifically intended for that type of contaminate, and apply more than one purification container to the inside portion of the reservoir 10. In this manner, a number of contaminates may be treated with respect to the fluid employed in a given system. Furthermore, the replacement of the chemicals is accomplished far more easily than heretofore known in the art, which required the use of large containers usually, being hauled to a specific location, and the liquid chemicals applied via pumps. The replacement of the purification container 20 would be accomplished by merely removing the empty container and installing or affixing a new container to the reservoir side wall.

It is further contemplated that the present invention has use beyond providing purification chemicals in a liquid recirculating system such as the type described above, e.g. air conditioning, water recirculating systems. For purposes of the present invention, the word fluid can be taken to encompass air as well. It will be appreciated that the present invention directed to a container which incorporates a solid mass of purification chemicals of whatever nature desired for the purpose of purifying the surrounding fluid which can be air. Example, the container can incorporate a mass of chlorodioxide for purifying air contained within a structure. The container would be mounted in the metallic duct work of the system, and as moisture laden air flows through the container, the chlorodioxide would become dissolved in the air thereby purifying and cleaning the air flowing through the system. It will be appreciated that as the flow of air increases, the rate of dissolution of the solid chemicals in the container will increase, and insure that in time, the entire mass of fluid flowing through the structure, such as a home or an apartment building, will become purified. Another potential use for the container of the present invention would be to include a solid mass of anti-static materials or chemicals, and eliminate contaminates in the air which cause static electricity. Hence, while the present invention has a principal application in liquid or water cooling systems, nevertheless, the invention is similarly applicable to any system for purifying air or other gaseous environments.

It will further be appreciated that due to the safety features of the present container incorporating the solid chemical mass therein, the user may easily handle the positioning of the container in any system since it eliminates the need for the user or operator to actually handle chemicals. The container or box is simply installed in the system, and once the solid mass of purification chemical has become expended, the operator would simply remove the box and replace the same with a new box having a fresh supply of chemical therein. The box is not refillable and therefore, the user does not handle any of the chemicals incident to the particular application involved. Furthermore, the need or requirement for extraneous equipment such as pumps or equipment required to disburse chemicals into the system has been eliminated, thereby simplifying the entire procedure for installing and replacing purification chemicals in any circulating system involving either a liquid circulation system, or a gaseous circulating system.

It is therefore apparent from the above description that the present invention provides a convenient and easily installable purification system for a fluid system especially of the type employed in air conditioning systems wherein water or fluid flows through a cooling tower in the recirculation process of the use of the system. The present invention allows for the elimination of cumbersome large chemical containers heretofore utilized in order to pump purification chemicals into the system. The replacement of the purification container is a simple task for a single engineer, and eliminates the need for pumps and other collateral equipment heretofore used in the current state of the art. Hence, the objects and advantages as set forth previously are achieved by virtue of the present invention.

While there has been described what is at present considered to be the preferred embodiments of the invention, it will be understood that various modifications may be made therein and it is intended to cover in the appended claims all such modifications as fall within the true spirit and scope thereof.

What is claimed is:

1. Improved fluid purifier adapted to disperse contaminate cleansing chemicals into a fluid reservoir formed by continuous side walls through which a contaminated fluid circulates on a continuous basis, comprising, a container formed by a back wall, opposed side walls, a top and bottom wall integrally formed into a box configuration and having an open front portion, a front wall bounded by four edges and being sized and adapted to enclose said container along said front portion thereof, said front wall having at least one aperture formed therein to allow a fluid path of travel into said container, locking means associated with said container and said front wall for lockingly engaging said front wall to said container along the front portion thereof thereby to form an enclosed container, said front wall forming a slightly non-fluid tight sealing seam relative to said container such that fluid is allowed to seep into said container when said front wall is lockingly engaged to said container, a mass of solid dissolvable material adapted to purify the fluid circulating in the system, entrapped within said enclosed container, an attachment means for disengageably securing said container to the interior of at least one of the side walls of the reservoir below the fluid line within said reservoir, whereby said container containing said solid dissolvable mass may be mounted within the reservoir and below the fluid line to allow fluid to seep into and totally fill said container with the contaminated fluid and flow out therefrom on a continuous basis thereby to disperse and dissolve said purification chemicals into said fluid and purify same as the fluid flows through the reservoir.

2. The improved fluid purifier as set forth in claim 1 above, wherein said container and said front wall are formed of a plastic material.

3. The improved fluid purifier as set forth in claim 2 above, wherein said plastic comprises a polypropylene rigid plastic material.

4. The improved fluid purifier as set forth in claim 1 above, wherein said front wall includes at least two pair of apertures formed therein, said pairs of apertures being positioned in opposed relation one pair to the other pair, whereby fluid may pass through said apertures into said container at opposed ends of the container and also allowing fluid to seep through the non-fluid sealing seam established between said front wall and said container whereby contaminated fluid contained within the reservoir may flow through the container on a continuous basis until the mass of purification chemicals are totally dispersed and dissolved in the fluid thereby to purify the same.

5. The improved fluid purifier as set forth in claim 1 above, wherein said front wall is provided with a plurality of apertures formed therethrough around the periphery of said front wall to insure fluid flow through said container.

6. The improved fluid purifier as set forth in claim 1 above wherein said solid mass of purification chemicals is selected from the group consisting of scale inhibitors, corrosion inhibitors, biodispersements, biopenetrants, microbiocides, biocides, and algaecides.

7. The improved fluid purifier as set froth in claim 1 above, wherein said attachment means comprises a magnetic pad having a magnetized front surface, fixedly secured to the back wall of said container thereby to accommodate the magnetic securement of said container to the interior side wall of a metallic reservoir.

8. The improved fluid purifier as set forth in claim 1 above, wherein said attachment means comprises a holder sized and adapted to hold and arrest said container therein, and including an elongated holding arm adapted to engage a side wall of the reservoir at one end and maintain the container within the holder below the fluid line within the reservoir.

9. The improved fluid purifier as set forth in claim 1 above, wherein said locking means for locking said front wall to said container comprises a reverse slot formed along the peripheral edges of said top wall, bottom wall, and side walls of said container and a reversed flange formed along the peripheral edge of said front wall, said reverse slot and reverse flange adapted to lockingly engage thereby to lock said front wall to said container in a non-fluid tight sealing engagement.

* * * * *